Inventor
E. C. LEE
By Philip M. Bolton
Attorney

March 10, 1959   E. C. LEE   2,877,031
FLEXIBLE CONNECTING MEANS FOR ANCHORING
A SUBMARINE CABLE TO A REPEATER HOUSING
Filed July 1, 1954   4 Sheets-Sheet 2
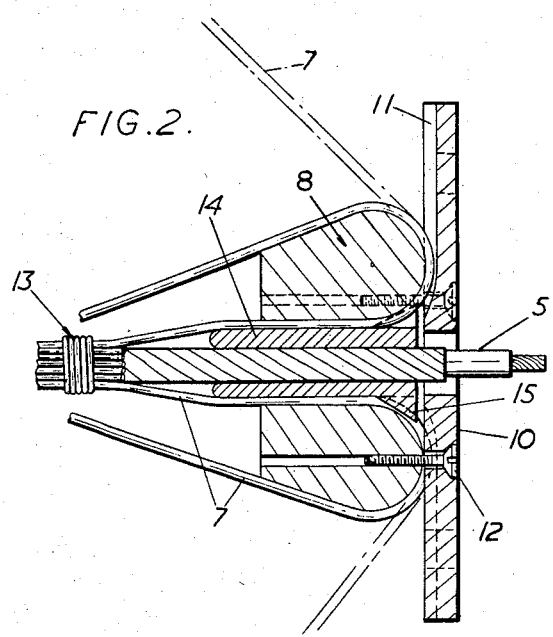
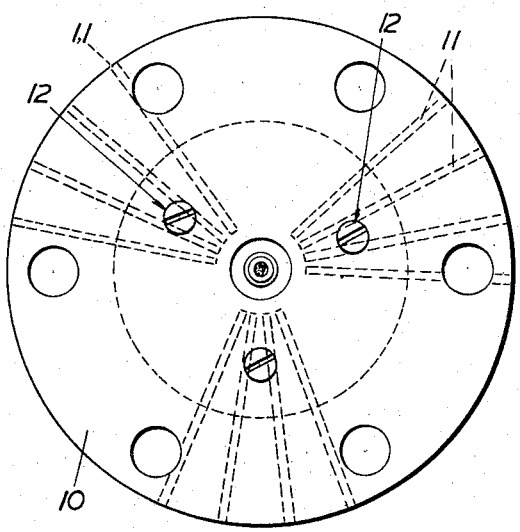
*Inventor*
E. C. LEE
By Philip M. Bolton
*Attorney*

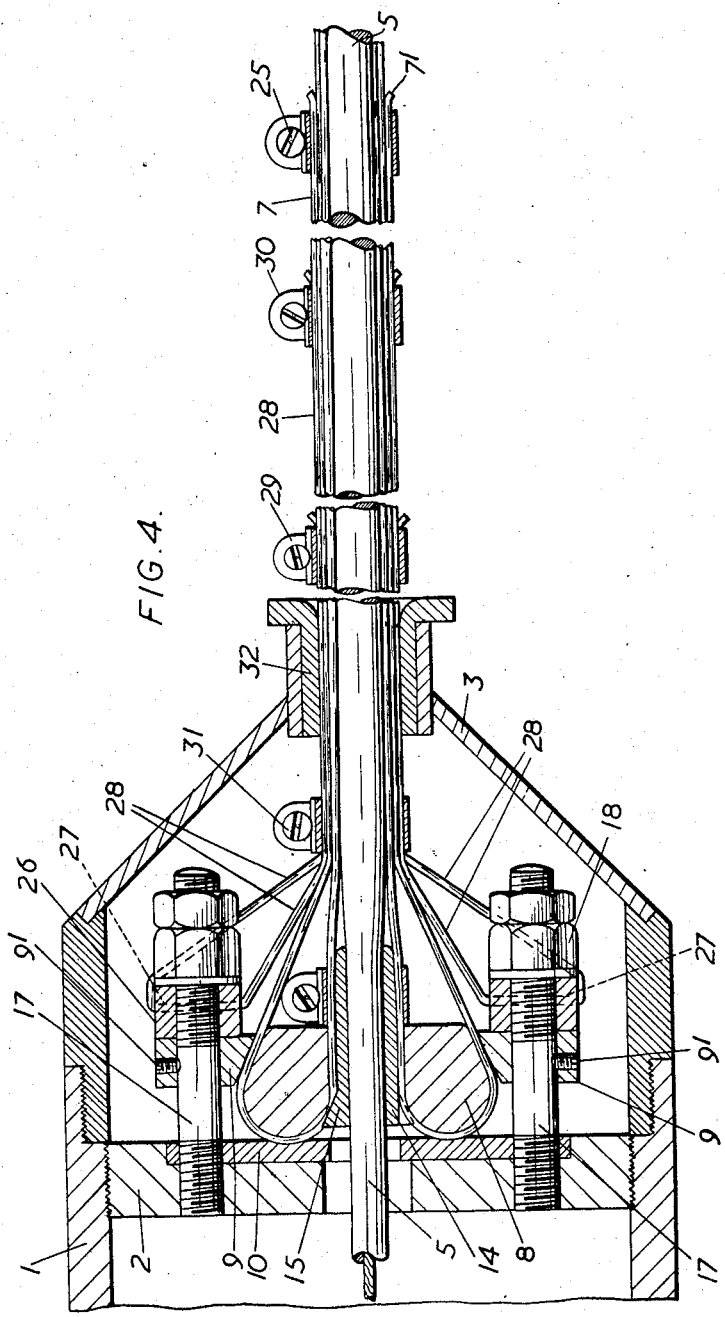

March 10, 1959 E. C. LEE 2,877,031
FLEXIBLE CONNECTING MEANS FOR ANCHORING
A SUBMARINE CABLE TO A REPEATER HOUSING
Filed July 1, 1954 4 Sheets-Sheet 4

Inventor
E. C. LEE
By Philip M. Bolton
Attorney

2,877,031
Patented Mar. 10, 1959

2,877,031

FLEXIBLE CONNECTING MEANS FOR ANCHORING A SUBMARINE CABLE TO A REPEATER HOUSING

Edwin Charles Lee, London, England, assignor to International Standard Electric Corporation, New York, N. Y., a corporation of Delaware Application July 1, 1954, Serial No. 440,799

Claims priority, application Great Britain July 8, 1953

11 Claims. (Cl. 287—85)

This invention relates to flexible connecting means for armoured electric cables and has particular reference to arrangements for anchoring a submarine cable to a repeater housing.

As the housing is rigid while the armoured cable is relatively flexible a sharp bend may occur during cable laying operations at the point where the cable enters the housing and in some circumstances this might result in damage to the cable. Furthermore, there is a danger of the cable twisting axially with respect to the housing and it is an object of the present invention to provide an improved cable clamping and terminating arrangement to overcome these difficulties.

According to the present invention there is provided an arrangement for anchoring an armoured electric cable to an apparatus housing, such as a submarine repeater, which comprises means for clamping the armour wires to the housing in interlocking relation therewith, whereby relative rotation between the housing and the cable is positively prevented and means for grading the flexibility of the cable adjacent to the housing, whereby the cable is stiffened at this point to prevent any sharp bends occurring due to the weight of the housing.

The armour wires are preferably accommodated in radial grooves in a part of the apparatus housing against which the armour wires are clamped, whereby rotation is prevented and the means for grading the flexibility of the cable may consist of reinforcing armour wires extending over the cable armour wires adjacent the housing, or one or more helices or coil springs secured at one end to the housing and surrounding the armour wires of the cable adjacent to the housing or a combination of both.

These and other features of the invention will be clearly understood by reference to the accompanying drawings in which:

Fig. 2 is a central sectional elevation showing a portion of the arrangement illustrated in Fig. 1.

Fig. 3 is an end elevation of the clamping plate shown in Fig. 2.

Fig. 4 is a central sectional elevation showing one end of a repeater housing illustrating a modified construction according to the invention.

Figure 1:
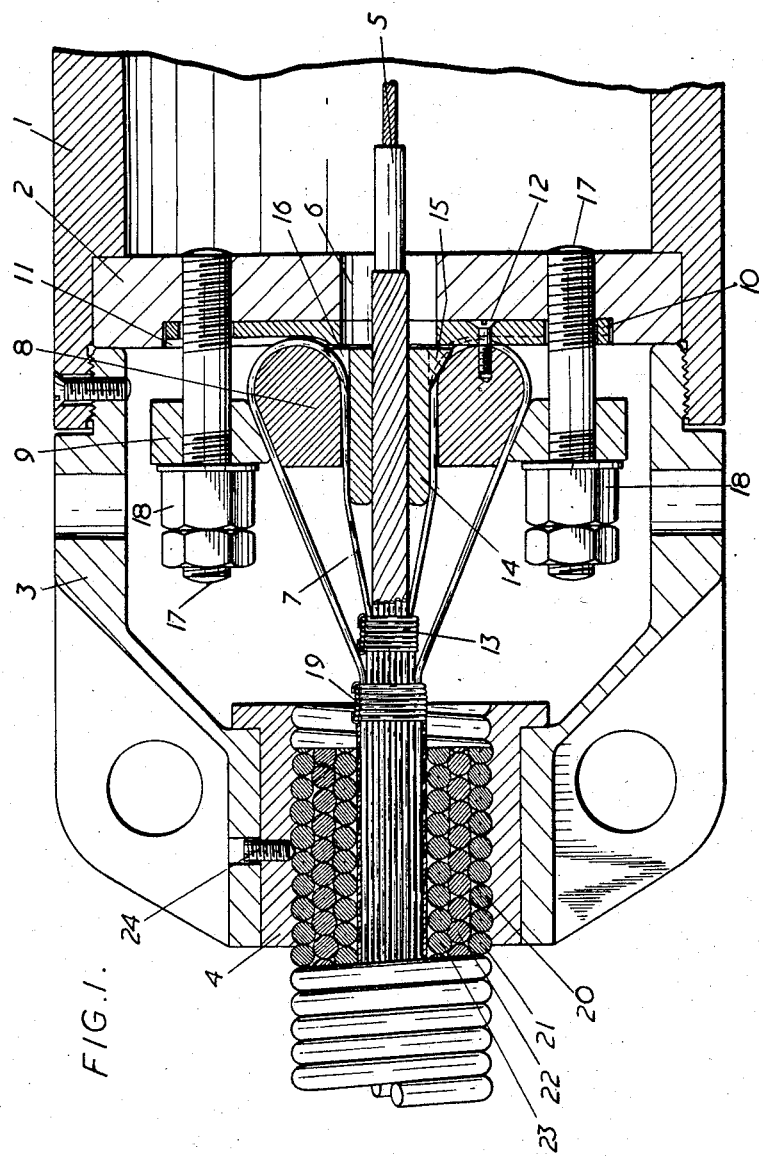
Fig. 1 is a central sectional elevation of one end of a submarine repeater housing incorporating the present invention.

Referring to Fig. 1, the end of the repeater housing is indicated at 1, and 2 is the anchor plate secured in the end of the repeater housing and held in position by the protective cone or cover plate 3 which carries a removable bushing 4 which will be referred to later.

The cable indicated at 5 passes through a central hole 6 in anchor plate 2 where it is terminated within the housing. The armour wires of the cable are indicated at 7 and it will be seen that they are bent back around the annular clamp ring 8 of frusto-conical formation and are secured by a clamp plate 9 having a conical bore which engages the wires lying on the conical surface of the clamp ring 8.

Recessed into the anchor plate 2 is an anti-rotation plate 10 which, as more clearly illustrated in Fig. 3, is provided with a plurality of radial grooves 11 which accommodate the anchor wires. Screws 12 enable the anti-rotation plate 10 to be secured to the clamp ring 8 at an intermediate stage in the bending of the armour wires as clearly indicated in Fig. 2. This feature assists assembly of the clamps particularly with stiff high tensile steel armour wires after the armour wires have been secured by the binding 13 and the protective sleeve 14 inserted over the cable core and within the clamp ring 8. This protective sleeve has a flange portion 15 which is provided with radial grooves 16 serving to position the armour wires around the circumference of the sleeve and when the wires have been bent around the ring 8 to approximately the position shown in dotted lines in Fig. 2 the anti-rotation plate 10 may be secured to the clamp ring 8 by the screws 12. Thus the armour wires are held correctly separated and trapped in their grooves in the anti-rotation plate. The whole assembly indicated in Fig. 2 is then brought up to the anchor plate 2 and fitted over the studs 17 secured in the anchor plate. The armour wires are then carried back over the outer coned surface of the clamp ring 8 and the clamp plate 9 is brought up to clamp them, the clamping nuts 18 being fitted in the process. After clamping the turned back armour wires are bent down to surround the original armouring of the cable and secured by suitable binding or clamping means 19. These turned back armour wires may be extended some distance beyond the repeater housing as will be hereinafter described.

The removable bushing 4 in the cover plate 3 enables the same cover plate to be used for varying sizes of cable within limits and this bushing is provided as shown with internal screw thread 20 into which the outer of three closely fitting concentrically arranged coil springs or helices 21, 22 and 23 is threaded and locked in position by a set screw 24. These helices or coil springs are more clearly shown in Fig. 5 from which it will be seen that they embrace the cable and extend by varying amounts from the repeater housing, so that the flexibility of the cable is graded, being stiffest near the point of entry of the cable into the repeater housing. The turned back armour wires 7 previously referred to are carried back over the armouring of the cable and are terminated beyond the helices as indicated at 7' in Fig. 5, these turned back wires also serving to stiffen the cable. The turned back wires 7 are secured at the end by a suitable binding or clip indicated at 25. The cable indicated generally by the reference 5 consists of the central conductor, an insulating layer and a jute covering over which the armour wires are laid in well-known manner.

Figure 5:
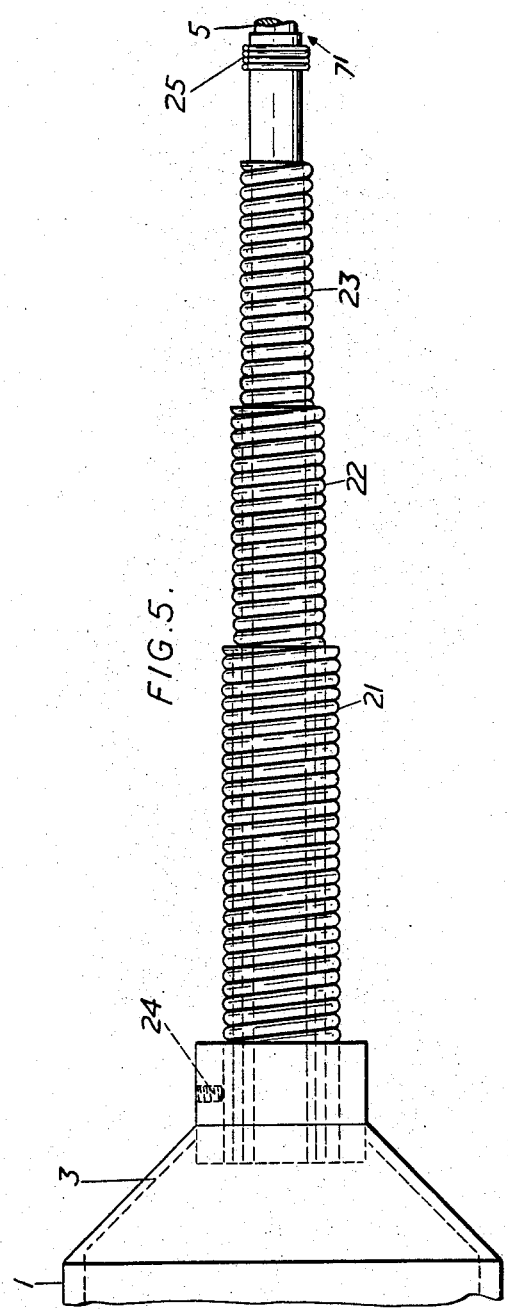
Fig. 5 is a diagrammatic view showing the preferred form of flexibility grading arrangement.

Fig. 4 illustrates a modified construction of cable termination, in which the grading of the flexibility of the cable is obtained by means of additional armour wires laid back along the cable by varying amounts, instead of the helices or coil springs illustrated in Figs. 1 and 5. In this construction the clamping arrangements are similar to those already described and similar parts are indicated by like reference numerals in the drawing. In this construction an additional clamp plate 26 is supported on the studs 17 and this clamp plate is provided with a plurality of radial holes indicated by the dotted lines 27 through which the additional armour wires 28 are looped. In order that the clamp plate 9 may be held in position during the assembly and clamping of the additional armour wires it is provided with set screws 9' for binding on the studs 17 as shown. The original armour wires 7 are turned back around the clamp ring 8 as described with reference to the Fig. 1 and extend an appreciable distance along the cable over the armour wires where they are terminated at 7' and secured by the binding clamp 25. The additional armour wires 28 after passing through the holes in the ring 26 are carried back over the cable where they are terminated and secured at varying points as indicated by the clamps at 29 and 30. A clamp 31 within the cover plate 3 serves to bind all the wires securely around the cable. In this construction also, the cover plate 3 is provided with a removable bushing 32 of plain bore, so that cables of different size may be accommodated within the same housing.

It will be understood that the cable, after passing through the anchor plate 2 will be connected to a stub cable and passed through a suitable watertight gland in a bulkhead, sealing off the actual apparatus compartment in which the conductor is connected to the equipment.

Although the invention has been described with particular reference to submarine repeater housings, it will be appreciated that the same principles may be adopted in connection with any terminating arrangement for armoured electric cables.

What I claim is:

1. An arrangement for anchoring an electric cable provided with armour wires to an apparatus housing structure, comprising a plate forming part of said housing structure and formed with radial grooves, means for clamping said armour wires in said radial grooves, whereby relative rotation between the housing structure and the cable is positively prevented and means for grading in a plurality of steps the flexibility of the cable adjacent to and exterior of the housing.

2. An arrangement according to claim 1, comprising a protective metal sleeve surrounding the cable core and comprising a flange provided with radial slots adapted to space the armour wires to coincide with said radial grooves.

3. An arrangement according to claim 2, wherein said means for clamping said armour wires comprises an annular metal clamp ring surrounding said sleeve.

4. An arrangement according to claim 3, wherein said armour wires are turned back around said clamp ring to extend over the existing armour wires of the cable and clamping means are provided at intervals, for clamping the turned back armour wires around said cable to grade its flexibility adjacent to the housing.

5. An arrangement according to claim 4, wherein said clamp ring is of frusto-conical form and a clamp plate having a conical bore is arranged to co-operate therewith to secure the armour wires to the housing.

6. An arrangement according to claim 5 and comprising an additional clamp ring and additional reinforcing wires supported by said clamp ring and extending over the cable armour wires for the purpose of grading the flexibility of the cable adjacent to the housing.

7. An arrangement according to claim 6, wherein the said clamp ring is provided with radial holes through which the reinforcing wires pass, the said holes serving to space the reinforcing wires uniformly around the cable armour wires.

8. An arrangement according to claim 1, wherein the means for grading the flexibility of the cable comprises a plurality of metal helices secured at one end to the housing and surrounding the cable adjacent to the housing.

9. An arrangement according to claim 8, comprising a plurality of nested helical springs of different diameters and different axial lengths, the outermost being secured at one end to the housing and the subsequent springs of reduced diameter and increasing lengths being arranged so that there is a progression from a multi-layer spring at the housing to a single layer surrounding the cable at the end of the spring assembly remote from the housing.

10. An arrangement according to claim 9, wherein the housing is provided with an end cover to enclose the clamping device and extend over a portion of the cable, the said cover being provided at its end remote from the housing with a removable bushing for the purpose described.

11. An arrangement according to claim 10, wherein the bushing is provided with an internal screw thread to accommodate the helices.

References Cited in the file of this patent
UNITED STATES PATENTS

| Number | Name | Date |
|---|---|---|
| 1,073,596 | Egerton | Sept. 23, 1913 |
| 1,246,964 | Lowe | Nov. 20, 1917 |
| 1,459,047 | Crossley | June 19, 1923 |
| 1,866,235 | Thiel | July 5, 1932 |
| 2,697,739 | Presswell | Dec. 21, 1954 |
| 2,771,502 | King et al. | Nov. 20, 1956 |

FOREIGN PATENTS

| Number | Country | Date |
|---|---|---|
| 59,062 | Netherlands | Mar. 15, 1947 |
| 175,826 | Great Britain | Mar. 2, 1922 |